O. OSTEN.
Improvement in Machines for Crozing and Chamfering Staves.

No. 132,734.

Patented Nov. 5, 1872.

Witnesses
J. L. Boone
C. M. Richardson

Inventor
Otto Osten
by Dewey & Co
Att'ys

UNITED STATES PATENT OFFICE.

OTTO OSTEN, OF TAHOE CITY, CALIFORNIA.

IMPROVEMENT IN MACHINES FOR CROZING AND CHAMFERING STAVES.

Specification forming part of Letters Patent No. 132,734, dated November 5, 1872.

*To all whom it may concern:*

Be it known that I, OTTO OSTEN, of Tahoe City, Placer county, State of California, have invented an Improvement in Machines for Crozing and Chamfering Staves; and I do hereby declare the following description and accompanying drawing are sufficient to enable any person skilled in the art or science to which it most nearly appertains to make and use my said invention or improvement without further invention or experiment.

My invention is fully set forth in the following description, in which reference is had to the accompanying drawing forming a part of this specification, in which—

Figure 1:
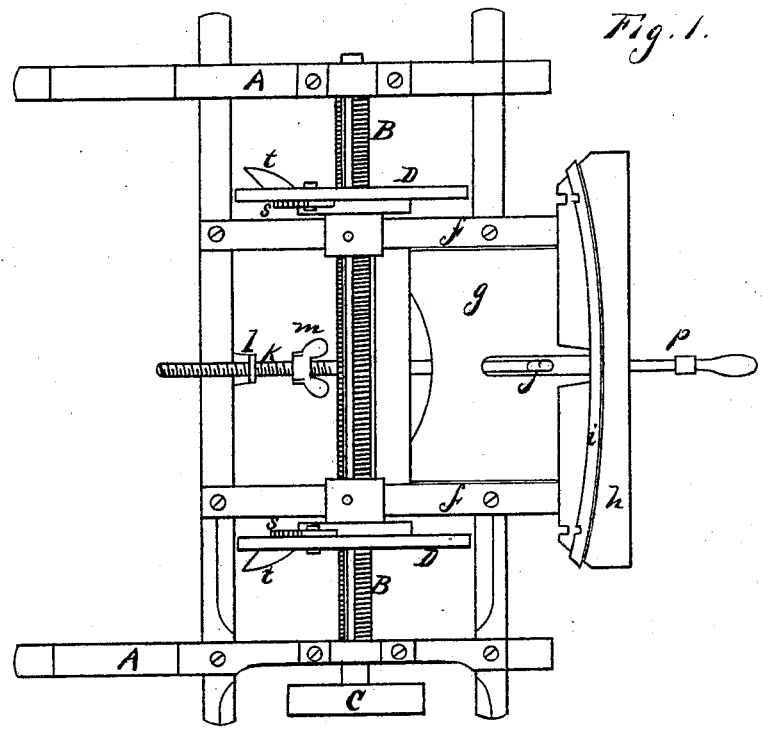
Figure 2:
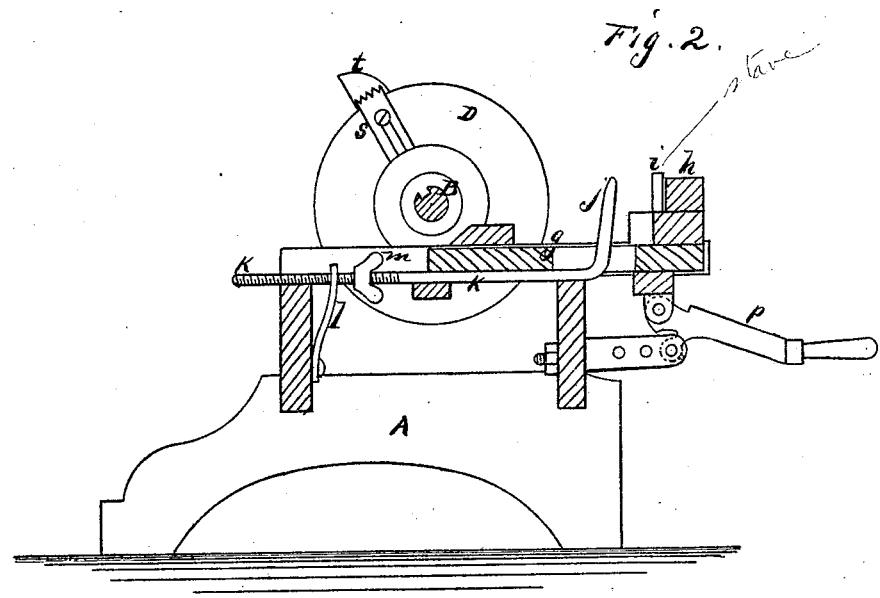

Figure 1 is a plan or top view of my machine; Fig. 2 is a transverse section seen from one end.

A represents a proper frame. A screw-shaft, B, extends across this frame, bearing in boxes at each end, and carrying at one end a driving pulley, C. Two disks, D D, each of which has a hub extending toward the middle of the shaft, are secured upon this screw, and can be moved back and forth as desired by simply turning them upon the shaft. A longitudinal groove is made along one side of the screw, which serves as a means of fastening the disks in place either by a key or by a pin passing through the hub into the groove. Two guides, *f f*, are secured a short distance apart upon the frame A, transversely to the shaft B, and between these guides a platform, *g*, is arranged to slide. On the outer edge of the platform is a ledge, *h*, the inner face of which is curved, so that the stave, represented by *i*, can be fitted closely against it. The movement of the sliding platform is limited by an upward-projecting standard, *j*, which passes through a slot in the platform in front of the ledge *h*. This standard is connected below the platform with a rod, *k*, which extends to the opposite side of the frame A, where it is supported in a spring-plate, *l*. The end of this rod is formed into a screw, and a set-nut, *m*, is turned upon this screw next to the platform, and serves to act as a stop to prevent the platform from moving too close to the disks. A lever, *p*, is secured to the platform and to the frame in such a manner that by lifting it the platform will be moved toward the disk, and by lowering it the platform will be withdrawn. To the inner faces of the disks D D, at intervals apart, narrow bits or steel-plates *s* are secured by a pin passing through a slot in the plates, so that the plates can be adjusted to or form the center of the disk, as required. The projecting ends of these plates are formed into teeth similar to the teeth of a saw, and serve to croze the stave. Adjustably secured to the outer faces of the disks, opposite the crozing saws, are sharp cutting-blades *t*, which stand at an angle to the face of the disk, as shown. These knives serve to chamfer the ends of the stave.

Now, by placing the stave in position and moving the platform against the revolving edge of the disks the stave is both crozed and chamfered at the same time. The disks can be shifted to or from each other, as required, to fit any length of stave.

Having thus described my invention, what I claim, and desire to secure by Letters Patent, is—

1. The grooved screw-shaft B, in combination with the crozing and chamfering disks D D, substantially as and for the purpose above described.

2. The sliding platform *g*, with its ledge *h* curved on its inner face, as described, in combination with the standard *j*, screw-rod *k*, plate *l*, and nut *m*, substantially as and for the purpose above described.

In witness whereof I hereunto set my hand and seal.

OTTO OSTEN. [L. S.]

Witnesses:
   J. L. BOONE,
   C. M. RICHARDSON.